(12) United States Patent
Prabhu et al.

(10) Patent No.: US 7,434,546 B2
(45) Date of Patent: Oct. 14, 2008

(54) STEAM GENERATOR LOOSE PARTS COLLECTOR WEIR

(75) Inventors: Padmanabha J. Prabhu, Monroeville, PA (US); Robert M. Wepfer, Export, PA (US)

(73) Assignee: Westinghouse Electric Co. LLC, Pittsburgh, PA (US)

( * ) Notice: Subject to any disclaimer, the term of this patent is extended or adjusted under 35 U.S.C. 154(b) by 124 days.

(21) Appl. No.: 11/563,742

(22) Filed: Nov. 28, 2006

(65) Prior Publication Data

US 2008/0121194 A1    May 29, 2008

(51) Int. Cl.
    *F22B 37/48* (2006.01)
(52) U.S. Cl. ......................... 122/379; 122/32
(58) Field of Classification Search .................. 122/32, 122/379, 393, 397, 405; 376/310, 313, 316; 165/159, 163
    See application file for complete search history.

(56) References Cited

U.S. PATENT DOCUMENTS

| | | |
|---|---|---|
| 3,916,844 A | 11/1975 | Cassell |
| 4,055,048 A | 10/1977 | Reed |
| 4,079,701 A | 3/1978 | Hickman et al. |
| 4,205,963 A | 6/1980 | Marion et al. |
| 4,303,043 A | 12/1981 | Redding |
| 4,579,088 A | 4/1986 | Kim, Jr. et al. |
| 4,632,068 A | 12/1986 | Appleman et al. |
| 4,836,274 A | 6/1989 | Firth et al. |
| 5,390,219 A * | 2/1995 | Poussin et al. ............... 376/313 |
| 5,396,948 A | 3/1995 | Poussin |
| 6,173,680 B1 * | 1/2001 | Dague et al. ................. 122/441 |

\* cited by examiner

*Primary Examiner*—Gregory A Wilson

(57) ABSTRACT

A loose parts collection weir that is a nearly cylindrical structure that is integrally attached to the lower deck plate or sludge collector top plate of a steam generator to retain loose parts along the feedwater and recirculation water transit path to the tube bundle. The weir is a near vertical structure built into the upper drum of the steam generator, near the periphery of the lower deck plate or sludge collector top plate in the vicinity of the downcomer annulus. The weir may contain a radially inwardly projecting lip which forms a pocket for loose parts to collect. As the feedwater flows toward the downcomer annulus, loose parts will tend to deposit onto the lower deck plate aided by gravity and be trapped by the loose parts collection weir.

22 Claims, 3 Drawing Sheets

STEAM GENERATOR LOOSE PARTS COLLECTOR WEIR

FIELD OF THE INVENTION

The invention relates to steam generators for nuclear power plants and more particularly, to vertical steam generators having a loose parts collector.

BACKGROUND OF THE INVENTION

A nuclear steam generator comprises a vertically oriented shell, a plurality of U-shaped tubes disposed in the shell so as to form a tube bundle, a tube sheet for supporting the tubes at the ends opposite the U-like curvature, a dividing plate that cooperates with the tube sheet and channel head forming a primary fluid inlet header at one end of the tube bundle and a primary fluid outlet header at the other end of the tube bundle. A primary fluid inlet nozzle is in fluid communication with the primary fluid inlet header and a primary fluid outlet nozzle is in fluid communication with the primary fluid outlet header. The steam generator secondary side comprises a wrapper disposed between the tube bundle and the shell to form an annular chamber made up of the shell on the outside and a wrapper on the inside, and a feedwater ring disposed above the U-like curvature end of the tube bundle.

The primary fluid having been heated by circulation through the reactor core enters the steam generator through the primary fluid inlet nozzle. From the primary fluid inlet nozzle the primary fluid is conducted through the primary fluid inlet header, through the U-tube bundle, out the primary fluid outlet header, through the primary fluid outlet nozzle to the remainder of the reactor coolant system. At the same time, feedwater is introduced to the steam generator secondary side through a feedwater nozzle which is connected to a feedwater ring inside the steam generator. Upon entering the steam generator, the feedwater mixes with the water returning from the separators, called the recirculation stream. This mixture, called the downcomer flow is conducted down an annular chamber adjacent to the shell until the tube sheet near the bottom of the annular chamber causes the water to reverse direction passing in heat transfer relationship with the outside of the U-tubes and up through the inside of the wrapper. While the water is circulating in heat transfer relationship with the tube bundle, heat is transferred from the primary fluid in the tubes to the water surrounding the tubes causing a portion of the water to be converted to steam. The steam then rises and is conducted through a number of moisture separators that separate entrained water from steam, and the steam vapor then exits the steam generator and is circulated through typical electrical generating equipment to generate electricity in a manner well known in the art.

Since the primary fluid contains radioactive materials and is isolated from the feedwater only by the U-tube walls, the U-tube walls form part of the primary boundary for isolating these radioactive materials. It is, therefore, important that the U-tubes be maintained defect-free so that no breaks will occur in the U-tubes that will cause radioactive materials from the primary fluid to enter the secondary side, an undesirable result.

Loose parts enter the steam generator through the feedwater stream and can cause damage to the heat transfer tubes. This damage can result in having to plug or repair the damaged tubes to avoid contamination of the secondary fluid. In extreme cases, the damage can lead to a tube leak and forced outage with significant expense to the plant. Therefore, it is important to prevent foreign objects from entering the steam generator and/or to remove the loose parts from the steam generator before tube damage occurs.

Prior attempts to prevent steam generator loose parts from reaching the tube bundle have focused on a sieving action. For example, spray nozzles with small holes have been attached to the feedwater distribution ring to trap loose parts. Although such spray nozzles have succeeded in trapping larger parts, small parts may pass through the holes in the nozzles due to their size. Such loose parts, e.g., pieces of metal rope or rods, have caused tube damage in operating steam generators.

Accordingly, it is an object of this invention to provide a loose parts collector that will remove from the feedwater introduced into the steam generator substantially all loose parts before the feedwater is placed in contact with the tube bundle.

Additionally, it is an object of this invention to provide such a loose parts collector that will not impede the efficiency of the steam generator.

SUMMARY OF THE INVENTION

These and other objects are achieved by the present invention which employs a loose parts collector weir that is a nearly cylindrical structure that is built into the upper drum of a steam generator to trap loose parts along their transit path from the feedwater nozzle to the tube bundle. Desirably, the weir is located at the entry to the downcomer annulus that directs the incoming feedwater to the tube sheet where it reverses direction and flows around tubes in the tube bundle within the wrapper. Desirably, the weir contains an inwardly projecting lip or guard plate which, along with the weir and the lower deck plate to which the weir is attached, forms a pocket for the loose parts to collect without the possibility of re-entrainment until the parts are removed from the steam generator during a normal service outage. As the water flows from the upper drum toward the downcomer annulus, loose parts will tend to deposit on the lower deck plate aided by gravity and to be trapped by the loose parts collector weir.

The weir and lip may have a variety of geometries. For example, the weir may extend generally vertically upward and the lip may extend at an angle to the weir radially inward generally towards the center of the lower deck plate, or the lip or weir may have a shape similar to the arc of a circle or an ellipse. Furthermore, a deflector may be installed above and spaced from the loose parts collector weir, preferably attached to and extending from the steam generator shell. The purpose of the deflector is to direct the feedwater and water separated from steam toward the center of the lower deck plate so that loose parts may be retained by the loose parts collector weir as the water stream flows outward over the weir. Preferably, the weir is provided with a drain that will permit the water collected over the lower deck plate to drain when the water level in the generator is lowered during normal outages.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
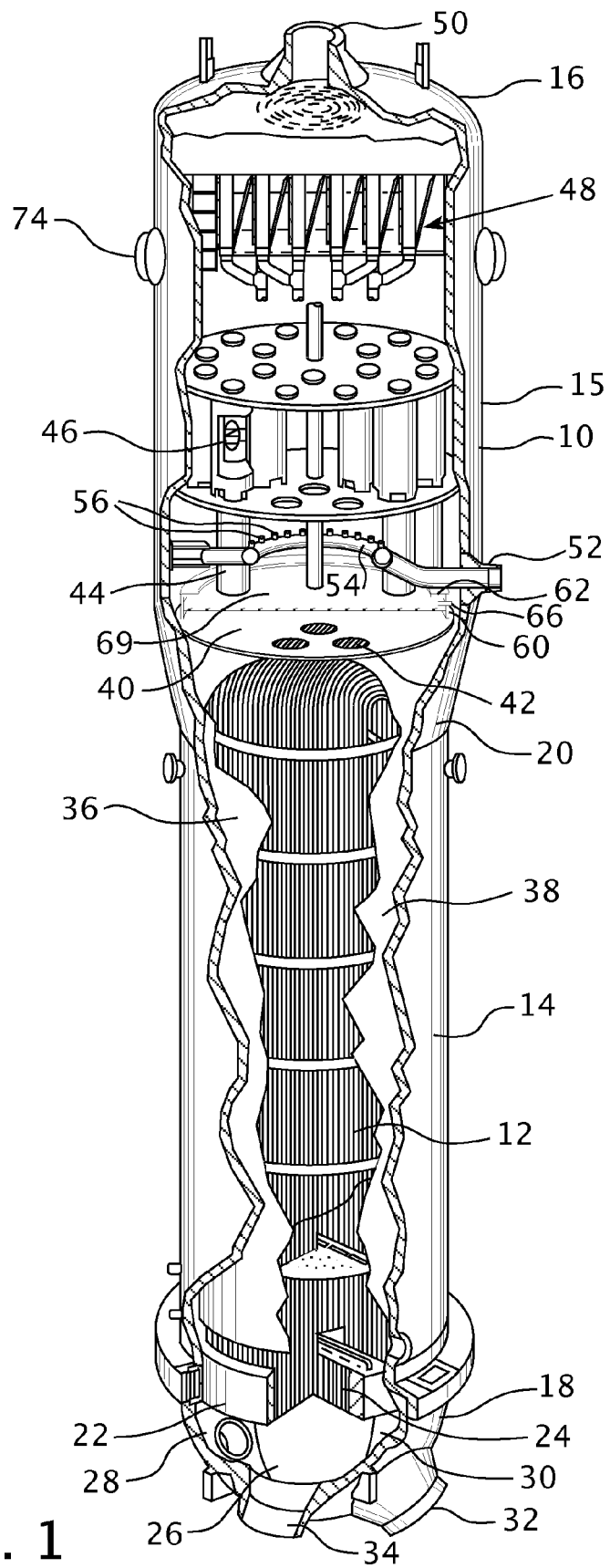
FIG. 1 is a perspective view, partially cut away, of a vertical steam generator constructed in accordance with one embodiment of the present invention.

Referring now to the drawings, FIG. 1 shows a steam or vapor generator 10 that utilizes a plurality of U-shaped tubes which form a tube bundle 12 to provide the heating surface required to transfer heat from a primary fluid to vaporize or boil a secondary fluid. The steam generator 10 comprises a vessel having a vertically oriented tubular shell portion 14 and a top enclosure or dished head 16 enclosing the upper end and a generally hemispherical shaped channel head 18 enclosing the lower end. The lower shell portion 14 is smaller in diameter than the upper shell portion 15 and a frustoconical-shaped transition 20 connects the upper and lower portions. A tube sheet 22 is attached to the channel head 18 and has a plurality of holes 24 disposed therein to receive ends of the U-shaped tubes. A dividing plate 26 is centrally disposed within the channel head 18 to divide the channel head into two compartments 28 and 30, which serve as headers for the tube bundle. Compartment 30 is the primary fluid inlet compartment and has a primary fluid inlet nozzle 32 in fluid communication therewith. The compartment 28 is the primary fluid outlet compartment and has a primary fluid outlet nozzle 34 in fluid communication therewith. Thus, primary fluid, i.e., the reactor coolant, which enters fluid compartment 30 is caused to flow through the tube bundle 12 and out through outlet nozzle 34.

The tube bundle 12 is encircled by a wrapper 36, which forms an annular passage 38 between the wrapper 36 with the shell and cone portions 14 and 20, respectively. The top of wrapper 36 is covered by a lower deck plate 40 which includes a plurality of openings 42 in fluid communication with a plurality of riser tubes 44. Swirl vanes 46 are disposed within the riser tubes to cause steam flowing therethrough to spin and centrifugally remove some of the moisture contained within the steam as it flows through this primary centrifugal separator. The water separated from the steam in this primary separator is returned to the top surface of the lower deck plate. After flowing through the primary centrifugal separator, the steam passes though a secondary separator 48 before reaching a steam outlet nozzle 50 centrally disposed in the dished head 16.

The feedwater inlet structure of this generator includes a feedwater inlet nozzle 52 having a generally horizontal portion called feedring 54 and discharge nozzles 56 elevated above the feedring. Feedwater, which is supplied through the feedwater inlet nozzle 52, passes through the feedwater ring 54, and exits through discharge nozzles 56 and mixes with water which was separated from the steam and is being recirculated. The mixture then flows down above the lower deck plate 40 into the annular passage 38. The water then enters the tube bundle at the lower portion of the wrapper 36 and flows among and up the tube bundle where it is heated to generate steam.

Figure 2:
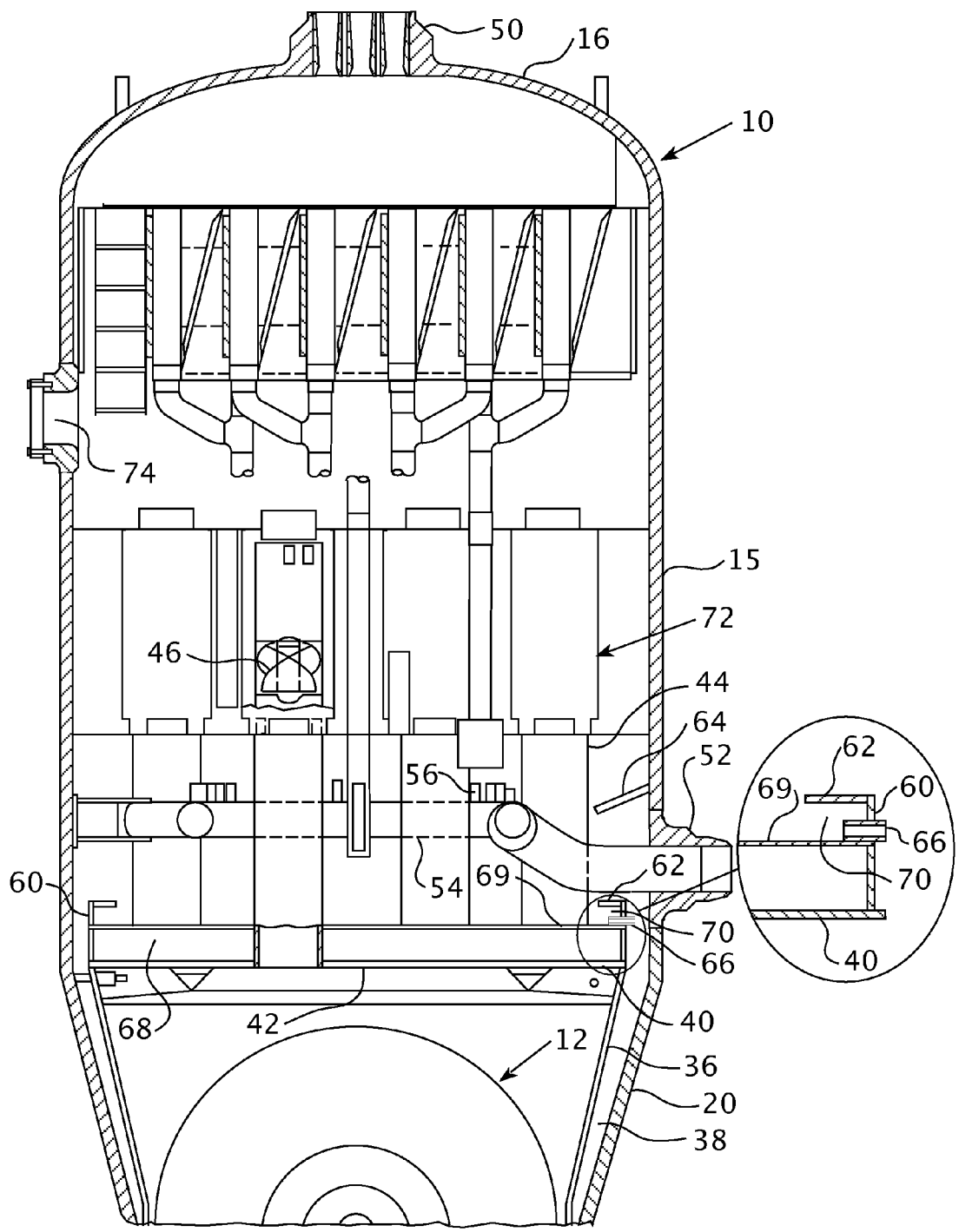
FIG. 2 is a cross section of the upper portion of the vertical steam generator illustrated in FIG. 1.

FIG. 2 is a cross sectional view of the upper portion of the steam generator shown in FIG. 1. The same reference characters are employed to designate the corresponding components in the two figures. The loose parts collector weir 60 of this invention is a nearly cylindrical wall structure that is interior to the upper drum, i.e., the interior volume above the lower deck plate 40 of the steam generator 10, to retain loose parts along the transit path from the feedwater discharge nozzle 56 to the tube bundle 12. The weir 60 is a vertical, or nearly vertical structure formed as an integral part of or affixed to the lower deck plate 40, such as by welding, at or near the periphery of the lower deck plate and circumscribes the lower deck plate surface, preferably at its near peripheral location. It should be understood that the weir 60 may be made in sections that span between the peripheral primary separator risers 44. It should also be understood that the weir may be positioned radially inward of the periphery of the lower deck plate 40, though the preferred location is at or near the periphery. The most effective location for the weir 60 is at the entry to the downcomer annulus 38. Desirably, the loose parts weir 60 may contain an inwardly projecting lip or guard plate 62 which, along with the weir 60 and the lower deck plate 40 to which it is attached, form a pocket 70 for the loose parts to collect without the possibility of re-entrainment until the parts are removed from the steam generator 10 during a normal outage. As water flows from the top of the lower deck plate 40 toward the downcomer annulus 38, loose parts will tend to be deposited onto the lower deck plate aided by gravity and be retained by the loose parts collector weir 60.

Figure 3A:
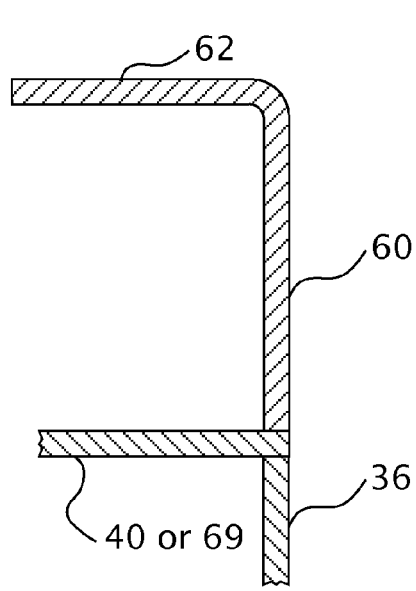
FIGS. 3A, 3B, 3C and 3D are schematic cross sections of various embodiments of the weir and lip of this invention.
Figure 3B:
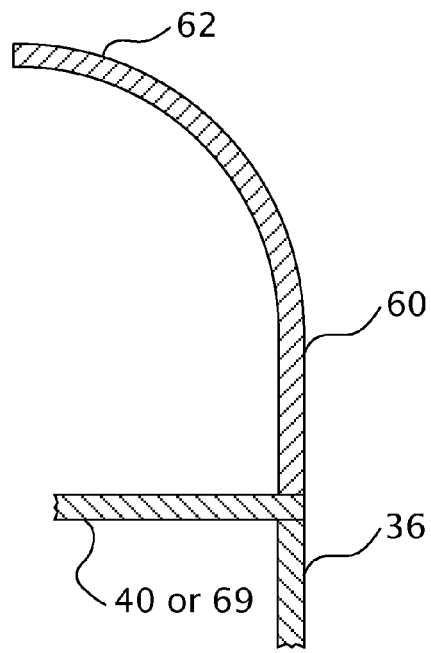
Figure 3C:
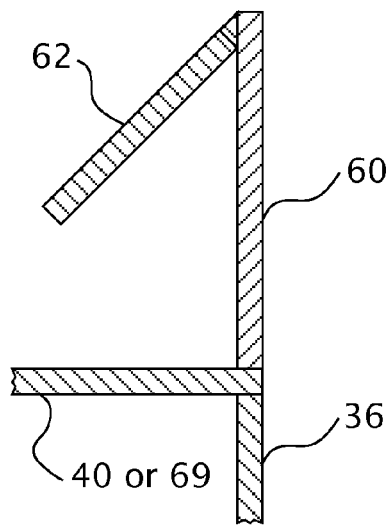
Figure 3D:
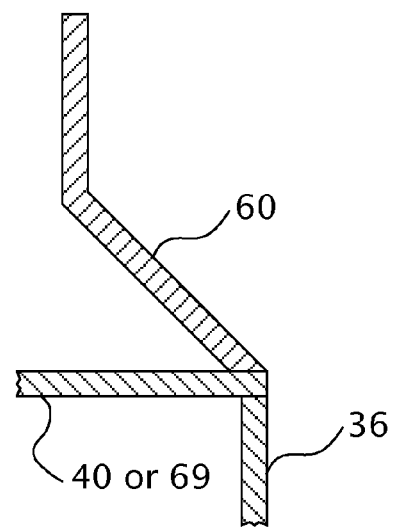

As shown in FIGS. 3A through 3D, the cross section of the weir 60 and lip 62 may have a variety of geometries. For example, the weir and lip may have the cross section of an angle illustrated in FIGS. 3A, 3C and 3D or it may have a shape similar to the arc of a circle or an ellipse as shown in FIG. 3B.

A test was performed to determine the effectiveness of the loose parts weir 60 in a steam generator mock-up. The test utilized 56 to 60 loose parts of varying sizes, such as steel rods, nails, screws, nuts, bolts, washers, wire, rope, gasket pieces, and machine shavings, all of various lengths ranging from 0.25 to 4.0 inches (0.62 to 10 cm). The mass of the parts tested ranged from 0.0001 to 0.04 pounds (0.043 to 17.8 gm). The smaller and lighter parts are more challenging and hence, more small parts were tested to challenge the design. The median mass of the parts tested was 0.0022 pounds (1 gm). The test showed that very small and light parts are more likely to go over the weir and reach the tube bundle. However, such parts have a much smaller risk of tube damage. The best designs performed at up to 93 percent efficiency with spray nozzle and 96 percent efficiency with J-nozzle feedwater discharges. It is anticipated that loose part collection performance will be enhanced in steam generator operation due an approximately 30 percent lower density and 80 percent lower viscosity of the water at steam generator operating conditions versus those at test conditions.

The loose parts collector weir 60 of this invention will have a negligible impact on the steam generator performance. The weir 60 does not affect steam generator heat transfer, steam pressure or feedwater pressure. The invention also imparts negligible pressure drop in the recirculation flow path and hence, has no measurable impact on the circulation ratio. The weir 60 provides sufficient capacity to collect loose parts for multiple operating cycles between cleaning, and separated loose parts can be removed from the steam drum by entry through a secondary manway 74.

Some operating generators have sludge collectors 68 integrated with the lower deck plate 40. For units with sludge collectors, the weir 60 is attached integrally to the sludge collector top plate 69 in lieu of the lower deck plate 40, however, its function is unaffected in this arrangement. Design changes to the sludge collectors, such as increasing the number of flow holes in the sludge collectors, may be performed if necessary to maintain the sludge collector performance. The weir of this invention thus provides an effective tool for reducing the likelihood of damage to the heat exchanger tubes in the tube bundle 12 by capturing a substantial portion of loose parts entering from the feedwater before the feedwater and the recirculated water re-enter the tube bundle 12. The invention can be built into new generators or retrofitted to existing generators since the weir can be fabricated in sections of a size that can fit through the secondary manways 74.

Returning to FIGS. 3A though 3D, it should be appreciated that the shape of the weir 60 and lip 62 may vary from that illustrated, e.g., the lip 62 may have a 90 degree angle to the vertical that may vary plus or minus 85 degrees. The length of the lip 62 should be greater than approximately 2 inches (5 cm), but more desirably between a length of approximately 2 to 6 inches (5-15 cm). The bend in the lip 62 relative to the weir 60 may have a radius of between 0.25 to 6 inches (0.6-15 cm) and height of the weir 60 above the lower deck plate 40 is approximately 2 or more inches (5 or more cm).

In another preferred embodiment, a deflector plate 64 may be installed and affixed to the interior of the upper shell 15, such as by welding, and extend radially inward over the lower deck plate 40 to better direct the water from the discharge nozzle 56 and the return flow from the primary moisture separator 72 towards the central region of the lower deck plate 40 to enhance the ability of the weir 60 to collect loose parts that may be contained in the water flow. This embodiment also directs loose parts which may originate from other than the feedwater inlet, such as from service activities and from above the deflector plate 64 to be directed radially inward, for retention by the weir.

In still another embodiment, a drain pipe or pipes 66 is preferably provided to drain the water on the lower deck plate 40 or on the sludge collector top plate 69 so the lower deck plate 40 and/or the sludge collector 68 can be accessed for servicing. The drain pipe 66 extends from one end generally radially at least 2 inches (5.08 cm) to the periphery where it passes through the wall of the weir 60 so that water on the lower deck plate 40 or the sludge collector top plate 69 can pass through the drain pipe 66 to drain into the annulus 38. The drain pipe 66 should provide a barrier that prevents loose parts from passing through the drain.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalents thereof.

What is claimed is:

1. A steam generator comprising:
   a vertically oriented outer shell;
   a plurality of heat exchange tubes for carrying a primary fluid within the interior thereof, supported within the outer shell, the primary fluid being heated under pressure by an external source;
   a wrapper shroud encircling the heat exchange tubes and a secondary fluid volume that when filled places a secondary fluid in contact with the heat exchange tubes in heat exchange relationship with the primary fluid while being substantially isolated from the primary fluid, the wrapper shroud being interposed between the heat exchange tubes and the outer shell and spaced from the outer shell, the wrapper shroud extending above the vertical extent of the heat exchange tubes, the space between the outer shell and the wrapper shroud defining a downcomer annulus;
   a lower deck plate covering the wrapper shroud and the heat exchange tubes, the lower deck plate including through holes and conduits in communication with the through holes extending vertically upward providing a fluid path from the interior of the wrapper shroud to a vapor separator positioned above the lower deck plate, the vapor separator designed to separate entrained moisture from the vapor and return the moisture to the lower deck plate;
   a weir surrounding and affixed to a peripheral area of the lower deck plate or sludge collector top plate and extending up above the lower deck plate in a generally vertical direction toward the vapor separator and terminating at an edge below and spaced from the vapor separator;
   a feedwater dispenser for communicating feedwater from a feedwater inlet and dispensing the feedwater on an upper region above the weir; and
   a deflector having one end attached to the shell at an elevation below the vapor separator and a distal end extending in a generally downward direction at an acute angle to the shell and above the lower deck plate, the deflector being spaced from the edge of the weir.

2. The steam generator of claim 1 wherein the upper portion of the weir has a lip that extends radially inward towards the center of the lower deck plate.

3. The steam generator of claim 2 wherein the lip has an angle with the vertical of approximately 90 degrees +/−85 degrees.

4. The steam generator of claim 2 wherein the lip has a length of approximately equal to or greater than 2 inches (5 cm).

5. The steam generator of claim 4 wherein the lip has a length of between approximately 2 inches and 6 inches (5 and 15 cm).

6. The steam generator of claim 2 wherein the lip is formed from a bend in a substantially vertical weir wall that has a radius of between 0.25 to 6 inches (0.6-15 cm).

7. The steam generator of claim 1 wherein the edge of the weir has a height above the lower deck plate of approximately 2 or more inches (5 or more cm).

8. The steam generator of claim 1 including a sludge collector disposed at an elevation below a top of the weir.

9. The steam generator of claim 8 wherein the sludge collector is formed between the lower deck plate and a sludge collector top plate.

10. The steam generator of claim 1 wherein the feedwater dispenser is a feedwater ring which circles above the lower deck plate or a sludge collector top plate.

11. The steam generator of claim 1 including a drain for the lower deck plate for draining the secondary fluid from the lower deck plate during service outages.

12. The steam generator of claim 11 wherein the drain comprises a drain pipe that extends through the weir to access the annulus at one end and at another end extends radially inward.

13. The steam generator of claim 11 wherein the drain pipe extends radially inward at least 2 inches (5 cm).

14. A steam generator comprising:
   a vertically oriented outer shell;
   a plurality of heat exchange tubes for carrying a primary fluid within the interior thereof, supported within the outer shell, the primary fluid being heated under pressure by an external source;
   a wrapper shroud encircling the heat exchange tubes and a secondary fluid volume that when filled places a secondary fluid in contact with the heat exchange tubes in heat exchange relationship with the primary fluid while being substantially isolated from the primary fluid, the wrapper shroud being interposed between the heat exchange tubes and the outer shell and spaced from the outer shell, the wrapper shroud extending above the vertical extent of the heat exchange tubes, the space between the outer shell and the wrapper shroud defining a downcomer annulus;

a lower deck plate covering the wrapper shroud and the heat exchange tubes, the lower deck plate including through holes and conduits in communication with the through holes extending vertically upward providing a fluid path from the interior of the wrapper shroud to a vapor separator positioned above the lower deck plate, the vapor separator designed to separate entrained moisture from the vapor and return the moisture to the lower deck plate;

a weir surrounding and affixed to a peripheral area of the lower deck plate and extending up above the lower deck plate in a generally vertical direction toward the vapor separator and terminating at an edge below and spaced from the vapor separator, an upper portion of the weir having a lip that extends radially inward towards the center of the lower deck plate; and a feedwater dispenser for communicating feedwater from a feedwater inlet and dispensing the feedwater on an upper surface of the lower deck plate.

15. The steam generator of claim 14 wherein the lip has an angle with the vertical of approximately 90 degrees +/−85 degrees.

16. The steam generator of claim 14 wherein the lip has a length of approximately equal to or greater than 2 inches (5 cm).

17. The steam generator of claim 16 wherein the lip has a length of between approximately 2 inches and 6 inches (5 and 15 cm).

18. The steam generator of claim 14 wherein the lip is formed from a bend in a substantially vertical weir wall that has a radius of between 0.25 to 6 inches (0.6-15 cm).

19. The steam generator of claim 14 wherein the edge of the weir has a height above the lower deck plate of approximately 2 or more inches (5 or more cm).

20. A steam generator comprising:
a vertically oriented outer shell;
a plurality of heat exchange tubes for carrying a primary fluid within the interior thereof, supported within the outer shell, the primary fluid being heated under pressure by an external source;

a wrapper shroud encircling the heat exchange tubes and a secondary fluid volume that when filled places a secondary fluid in contact with the heat exchange tubes in heat exchange relationship with the primary fluid while being substantially isolated from the primary fluid, the wrapper shroud being interposed between the heat exchange tubes and the outer shell and spaced from the outer shell, the wrapper shroud extending above the vertical extent of the heat exchange tubes, the space between the outer shell and the wrapper shroud defining a downcomer annulus;

a lower deck plate covering the wrapper shroud and the heat exchange tubes, the lower deck plate including through holes and conduits in communication with the through holes extending vertically upward providing a fluid path from the interior of the wrapper shroud to a vapor separator positioned above the lower deck plate, the vapor separator designed to separate entrained moisture from the vapor and return the moisture to the lower deck plate;

a weir surrounding and affixed to a peripheral area of the lower deck plate and extending up above the lower deck plate in a generally vertical direction toward the vapor separator and terminating at an edge below and spaced from the vapor separator, the lower deck plate including a drain for draining the secondary fluid from the lower deck plate during service outages in which the lower deck plate needs to be accessed; and a feedwater dispenser for communicating feedwater from a feedwater inlet and dispensing the feedwater on an upper surface of the lower deck plate radially inward of the weir.

21. The steam generator of claim 20 wherein the drain comprises a drain pipe that extends through the weir to access the annulus at one end at another end extends radially inward at least 2 inches (5 cm).

22. The steam generator of claim 20 wherein the flow through the drain is negligible during steam generator operation, but is sufficient to drain the lower deck plate without substantially holding up an outage during reactor shutdown.

* * * * *